United States Patent
Mizutani et al.

(10) Patent No.: US 11,081,715 B2
(45) Date of Patent: Aug. 3, 2021

(54) FUEL CELL SYSTEM

(71) Applicant: TOYOTA JIDOSHA KABUSHIKI KAISHA, Toyota (JP)

(72) Inventors: Chiaki Mizutani, Nisshin (JP); Shigeki Hasegawa, Toyota (JP); Kazuo Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

(21) Appl. No.: 16/657,955

(22) Filed: Oct. 18, 2019

(65) Prior Publication Data

US 2020/0144638 A1    May 7, 2020

(30) Foreign Application Priority Data

Nov. 2, 2018   (JP) .............................. JP2018-207048

(51) Int. Cl.
*H01M 8/04828* (2016.01)
*H01M 8/04537* (2016.01)

(52) U.S. Cl.
CPC ..... *H01M 8/0494* (2013.01); *H01M 8/04559* (2013.01); *H01M 8/04589* (2013.01)

(58) Field of Classification Search
CPC ........... H01M 8/0494; H01M 8/04559; H01M 8/04589
See application file for complete search history.

(56) References Cited

U.S. PATENT DOCUMENTS

2005/0048336 A1*  3/2005  Takebe .............. H01M 8/04298
                                                                    429/413
2018/0294494 A1* 10/2018  Mizutani ........... H01M 8/04492

FOREIGN PATENT DOCUMENTS

| JP | 2003-086220 A | 3/2003 |
| JP | 2006-318784 A | 11/2006 |
| JP | 2014-207049 A | 10/2014 |

* cited by examiner

*Primary Examiner* — Olatunji A Godo
(74) *Attorney, Agent, or Firm* — Dickinson Wright PLLC

(57) ABSTRACT

A fuel cell system includes: a fuel cell; a voltage detector; a current detector; an alternating current signal supply unit; a phase difference calculation unit configured to calculate, based on detected alternating voltage and detected alternating current, a phase difference between the detected alternating current and the detected alternating voltage; and an estimation unit configured to estimate, in accordance with the phase difference, an electric power generation distribution feature amount representing an electric power generation distribution in a cell surface of the fuel cell, with use of a predetermined relationship between the electric power generation distribution feature amount and the phase difference. The electric power generation distribution feature amount includes a value indicating a difference between a maximum value and a minimum value of local current density in the cell surface.

7 Claims, 6 Drawing Sheets

FUEL CELL SYSTEM

INCORPORATION BY REFERENCE

The disclosure of Japanese Patent Application No. 2018-207048 filed on Nov. 2, 2018 including the specification, drawings and abstract is incorporated herein by reference in its entirety.

BACKGROUND

1. Technical Field

The present disclosure relates to a fuel cell system.

2. Description of Related Art

A fuel cell includes a membrane electrode assembly configured with an electrolyte membrane and two electrode catalyst layers with the electrolyte membrane interposed therebetween. Electric power is generated on a surface-like power generation region of the membrane electrode assembly. In the present specification, such a power generation region is called a "cell surface." When the cell surface has an excessively deviated electric power generation distribution, it is difficult to perform efficient electric power generation. Accordingly, techniques for measuring the electric power generation distribution in the cell surface have conventionally been devised.

Japanese Patent Application Publication No. 2006-318784 discloses a fuel cell system including a measuring device that measures a current density distribution in the cell surface of a fuel cell. The fuel cell system includes a current density sensor dedicated for measuring the current density distribution in the cell surface. The current density distribution is measured with the current density sensor.

SUMMARY

However, in the conventional techniques, a dedicated current density sensor needs to be provided in order to obtain the electric power generation distribution in the cell surface. This complicates the structure of the fuel cell, and causes cost increase. Under these circumstances, there are demands for techniques that can estimate the electric power generation distribution in the cell surface without provision of a current density sensor.

For efficient electric power generation in the fuel cell, it is desirable to perform appropriate control of the wetness of the fuel cell. Since the amount of water in the fuel cell is estimated, and the wetness is controlled in accordance with the estimated amount of water before, the estimation process or the wetness control is complicated. Accordingly, there are demands for techniques that can appropriately control the wetness of the fuel cell with a process easier than conventional process.

The present disclosure can be implemented according to the following aspects.

According to one aspect of the present disclosure, a fuel cell system is provided. The fuel cell system includes: a fuel cell; a voltage detector; a current detector; an alternating current signal supply unit; a phase difference calculation unit; and an estimation unit. The voltage detector is configured to detect an output voltage of the fuel cell. The current detector is configured to detect an output current of the fuel cell. The alternating current signal supply unit is configured to supply an alternating current signal to electrodes on both ends of the fuel cell. The phase difference calculation unit is configured to calculate, based on a detected alternating voltage that is detected by the voltage detector and a detected alternating current that is detected by the current detector, a phase difference between the detected alternating current and the detected alternating voltage. The estimation unit is configured to estimate, in accordance with the phase difference, an electric power generation distribution feature amount representing an electric power generation distribution in a cell surface of the fuel cell, with use of a predetermined relationship between the electric power generation distribution feature amount and the phase difference. The electric power generation distribution feature amount includes a value indicating a difference between a maximum value and a minimum value of local current density in the cell surface.

The inventor of this application found out that there is a correlation between the electric power generation distribution feature amount indicative of the electric power generation distribution in the cell surface of a fuel cell and a phase difference between the detected alternating current and the detected alternating voltage. The inventor of this application found out that there is a prescribed relationship between a difference of the maximum value vs the minimum value of the local current density in the cell surface, and the phase difference in particular. Based on the relationship, the fuel cell system estimates an electric power generation distribution feature amount in accordance with the phase difference. Hence, the fuel cell system can estimate the electric power generation distribution in the cell surface of the fuel cell without providing a current density sensor.

In the fuel cell system, the cell surface may have an in-surface cathode gas passage from an inlet to an outlet of the cell surface for a cathode gas flowing in the cell surface. When the in-surface cathode gas passage is divided into an upstream portion on the side of the inlet and a downstream portion on the side of the outlet, the electric power generation distribution feature amount may indicate whether the electric power generation distribution in the cell surface corresponds to a first electric power generation distribution where a maximum value of the local current density is present in the upstream portion, and a minimum value of the local current density is present in the downstream portion, or a second electric power generation distribution where the maximum value of the local current density is present in the downstream portion and the minimum value of the local current density is present in the upstream portion.

In the fuel cell system, the electric power generation distribution feature amount estimated in accordance with the phase difference indicates whether the electric power generation distribution corresponds to the first electric power generation distribution or the second electric power generation distribution. Accordingly, it is possible to estimate the electric power generation distribution in the cell surface of the fuel cell without providing a current density sensor.

In the fuel cell system, the electric power generation distribution feature amount may indicate whether the electric power generation distribution in the cell surface corresponds to the first electric power generation distribution or the second electric power generation distribution with positive and negative signs of the electric power generation distribution feature amount.

The fuel cell system distinguishes whether the electric power generation distribution corresponds to the first electric power generation distribution or the second electric power generation distribution with positive and negative signs of the electric power generation distribution feature amount. Hence, the fuel cell system can easily estimate electric power generation distribution based on the electric power generation distribution feature amount.

The fuel cell system may further includes an operating condition control unit configured to change, when the electric power generation distribution feature amount estimated based on the phase difference is out of a predetermined allowable range, an operating condition of the fuel cell system such that the electric power generation distribution feature amount falls within the allowable range.

In the fuel cell system, when the electric power generation distribution feature amount representing a difference between the maximum value and the minimum value of local current density in the cell surface becomes out of an allowable range, the fuel cell system can be controlled under an appropriate operating condition such that the electric power generation distribution feature amount falls within the allowable range.

In the fuel cell system, the estimation unit may estimate, in accordance with the phase difference, whether a wet state of the fuel cell is a first state where wetness of the fuel cell is lower than a predetermined wetness range, a second state where the wetness of the fuel cell is within the wetness range, or a third state where the wetness of the fuel cell is higher than the wetness range.

Since the fuel cell system can estimate, in accordance with phase difference, whether the fuel cell is in any one of three states relating to the wetness of the fuel cell system, appropriate control can be executed in accordance with the estimation.

The fuel cell system may further include an operating condition control unit configured to change, when the fuel cell is estimated to be in the first state or the third state, an operating condition of the fuel cell system such that the fuel cell is put in the second state.

In the fuel cell system, when the fuel cell is in the first state where the wetness of the fuel cell is low, or in the third state where the wetness is high, the fuel cell system can appropriately be controlled so as to be in the second state.

According to another aspect of the present disclosure, a fuel cell system is provided. The fuel cell system includes: a fuel cell; a voltage detector; a current detector; an alternating current signal supply unit; a phase difference calculation unit; and an operating condition control unit. The voltage detector is configured to detect an output voltage of the fuel cell. The current detector is configured to detect an output current of the fuel cell. The alternating current signal supply unit is configured to supply an alternating current signal to electrodes on both ends of the fuel cell. The phase difference calculation unit is configured to calculate, based on a detected alternating voltage that is detected by the voltage detector and a detected alternating current that is detected by the current detector, a phase difference between the detected alternating current and the detected alternating voltage. The operating condition control unit is configured to control a wet state of the fuel cell by changing an operating condition of the fuel cell system in accordance with the phase difference. When the phase difference is a second value that is larger than a first value, the operating condition control unit sets the operating condition of the fuel cell system to an operating condition where a wetness of the fuel cell is lower than a wetness of the fuel cell when the phase difference is the first value.

In the fuel cell system, the wet state of the fuel cell is controlled in accordance with the phase difference. Hence, the wetness of the fuel cell can appropriately be controlled with a process simpler than the conventional process.

The present disclosure can be implemented in various aspects. For example, the present disclosure can be implemented in the aspect of a controller of the fuel cell system, a control method, or the like, other than the fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
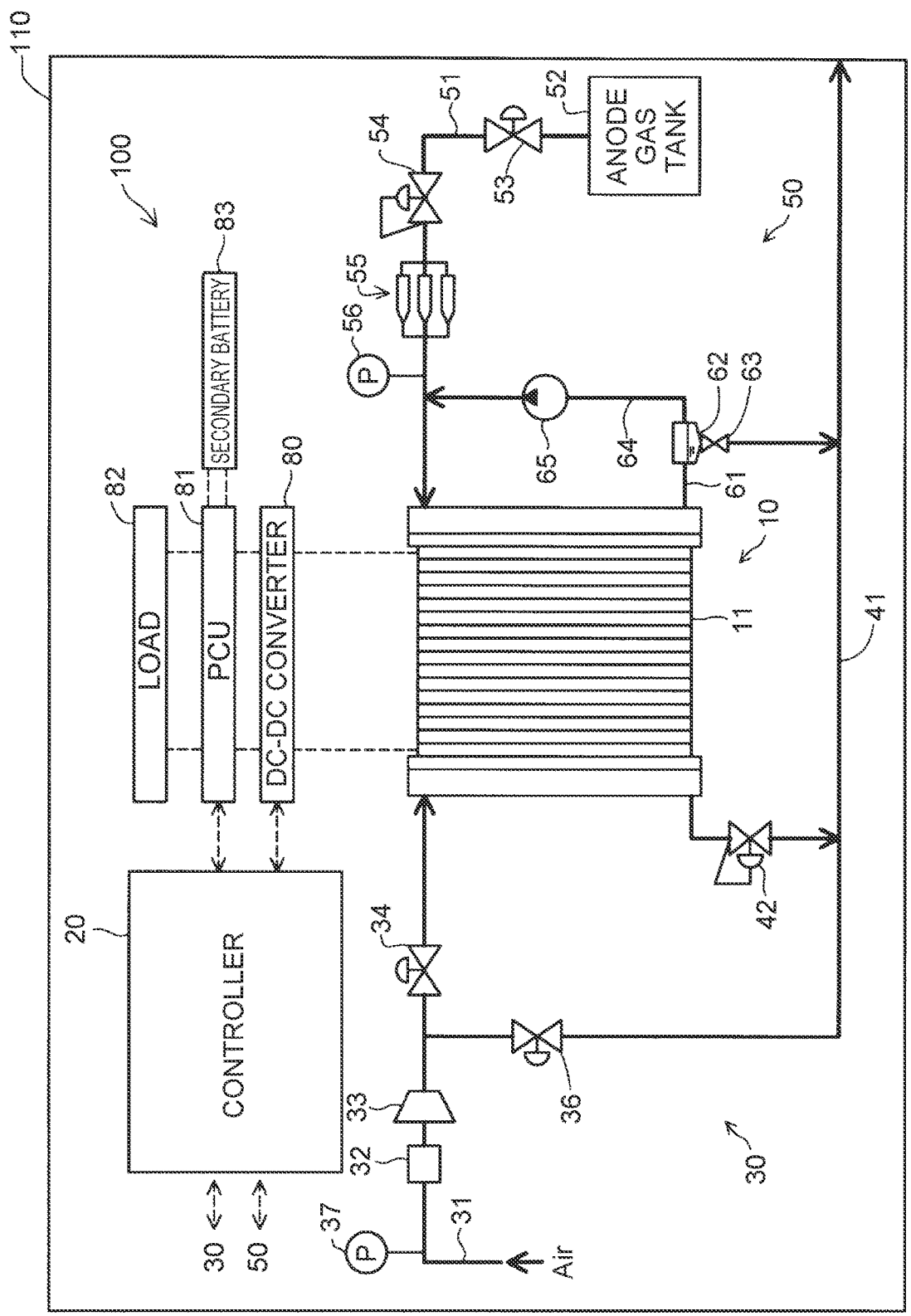
FIG. 1 is an explanatory view showing the configuration of a fuel cell system of one embodiment.

FIG. 1 is an explanatory view showing the configuration of a fuel cell system 100 according to one embodiment. The fuel cell system 100 is mounted on a vehicle 110, for example. The fuel cell system 100 outputs electric power that serves as a driving power source of the vehicle 110 in response to the request from a driver.

The fuel cell system 100 includes a fuel cell stack 10, a controller 20, a cathode gas supply unit 30, an anode gas supply unit 50, a DC-DC converter 80, a power control unit (hereinafter, referred to as "PCU") 81, a load 82, and a secondary battery 83. The controller 20 is configured as one or more ECUs that include a CPU, a memory, and an interface. The controller 20 executes control of the fuel cell system 100 by executing computer programs stored in the memory. However, some or all of the functions of the controller 20 may be implemented by a hardware circuitry.

The fuel cell stack 10 has a stack structure formed from a stack of a plurality of single cells. Although illustration is omitted, each of the single cells 11 includes a membrane electrode assembly having an electrolyte membrane, and an anode electrode catalyst layer and a cathode electrode catalyst layer disposed on both sides of the electrolyte membrane. Each of the single cells 11 also includes a set of separators for holding the membrane electrode assembly. The electrolyte membrane is a solid polymer membrane having proton conductivity, for example. The single cell 11 generates electric power upon reception of anode gas and cathode gas supplied as reactant gas. In the present embodiment, hydrogen gas is used as the anode gas, and air is used as the cathode gas. Note that other types of anode gas and cathode gas may also be used.

The cathode gas supply unit 30 includes a cathode gas pipeline 31, an atmospheric pressure sensor 37, an air flowmeter 32, a compressor 33, a first on-off valve 34, a flow dividing valve 36, a cathode offgas pipeline 41, and a first regulator 42.

The atmospheric pressure sensor 37 is provided in the cathode gas pipeline 31 to measure an inlet pressure of the cathode gas pipeline 31. The air flowmeter 32 is provided in the cathode gas pipeline 31 to measure the flow rate of taken-in air. The compressor 33 is connected with the fuel cell stack 10 through the cathode gas pipeline 31. Under the control of the controller 20, the compressor 33 compresses the cathode gas taken in from the outside, and supplies the compressed cathode gas to the fuel cell stack 10.

The first on-off valve 34 is provided between the compressor 33 and the fuel cell stack 10. The first on-off valve 34 is opened and closed by the control of the controller 20. The flow dividing valve 36 is provided between the compressor 33 and the cathode offgas pipeline 41 to divide the amount of air flowing into the fuel cell stack 10 and the cathode offgas pipeline 41 by the control of the controller 20.

The cathode offgas pipeline 41 discharges the cathode offgas discharged from the fuel cell stack 10 to the outside of the fuel cell system 100. The first regulator 42 is a back pressure regulating valve that regulates the pressure at a cathode gas outlet of the fuel cell stack 10.

The anode gas supply unit 50 includes an anode gas pipeline 51, an anode gas tank 52, a second on-off valve 53, a second regulator 54, injectors 55, a pressure sensor 56, an anode offgas pipeline 61, a gas liquid separator 62, an exhaust valve 63, a circulation pipeline 64, and an anode gas pump 65.

The anode gas pipeline 51 is a supply passage for supplying anode gas to the fuel cell stack 10. The anode gas tank 52 is connected with an anode gas inlet manifold of the fuel cell stack 10 through the anode gas pipeline 51 to supply anode gas to the fuel cell stack 10. The second on-off valve 53, the second regulator 54, and the injectors 55 are provided in this order from an upstream side in the anode gas pipeline 51. The second on-off valve 53 is opened and closed by the control of the controller 20. The second regulator 54 regulates the pressure of the anode gas on the upstream side of the injectors 55. The pressure sensor 56 is provided on the downstream side of the injectors 55 in the anode gas pipeline 51. The pressure sensor 56 measures a pressure value on the downstream of the injectors 55.

The injectors 55 are on-off valves that are electromagnetically driven in accordance with a driving period or valve opening time set by the controller 20. The injectors 55 regulate the supply amount of anode gas supplied to the fuel cell stack 10. In the present embodiment, the injectors 55 are provided in the anode gas pipeline 51. The controller 20 controls the amount of anode gas supplied to the fuel cell stack 10 by controlling the driving period or valve opening time of the injectors 55 such that a measurement value of the pressure sensor 56 does not become less than a target pressure value. The target pressure value is determined in accordance with the electric power requested to the fuel cell stack 10.

The anode offgas pipeline 61 connects an anode offgas outlet of the fuel cell stack 10 and the cathode offgas pipeline 41. The anode offgas pipeline 61 is a discharge passage for discharging anode offgas from the fuel cell stack 10. The anode offgas includes anode gas or nitrogen gas that is not used in power generation reaction.

The gas liquid separator 62 is provided in the anode offgas pipeline 61. The gas liquid separator 62 separates water as impurities from the anode offgas discharged from the fuel cell stack 10, and stores the separated water.

The exhaust valve 63 is an on-off valve provided in the anode offgas pipeline 61. The exhaust valve 63 is provided perpendicularly under the gas liquid separator 62. The exhaust valve 63 is opened and closed by the control of the controller 20. When the exhaust valve 63 is opened, the water in the gas liquid separator 62 and then the anode offgas are discharged from the exhaust valve 63. The water and the anode offgas discharged from the exhaust valve 63 are discharged to the outside through the cathode offgas pipeline 41 that is connected to the anode offgas pipeline 61.

The circulation pipeline 64 connects between a pipeline portion on the downstream side of the injectors 55 in the anode gas pipeline 51 and the gas liquid separator 62. The circulation pipeline 64 is equipped with the anode gas pump 65. The anode gas pump 65, which is driven by the control of the controller 20, pumps out the anode offgas that is separated from water by the gas liquid separator 62 to the anode gas pipeline 51. In the fuel cell system 100, the anode offgas containing anode gas is circulated and supplied to the fuel cell stack 10 again to enhance utilization efficiency of the anode gas.

The DC-DC converter 80 boosts the voltage output from the fuel cell stack 10, and supplies the voltage to the PCU 81. The PCU 81 incorporates an inverter, and supplies electric power to the load 82, such as a traction motor for driving a wheel, through the inverter. The PCU 81 also controls an output current of the fuel cell stack 10 based on a command from the controller 20.

The secondary battery 83 is connected to the fuel cell stack 10 through the PCU 81 and the DC-DC converter 80. The secondary battery 83 stores the electric power generated by the fuel cell stack 10. The secondary battery 83 also functions as a supply source of the electric power in the fuel cell system 100, together with the fuel cell stack 10. The electric power of the secondary battery 83 is supplied to the load 82, the compressor 33, the anode gas pump 65, and various valves. As the secondary battery 83, a lithium ion battery, a nickel-hydrogen battery, or the like, can be used.

The controller 20 controls each unit of the fuel cell system 100 in accordance with request electric power, and controls output of the fuel cell stack 10 or the secondary battery 83. The request electric power includes an external electric power generation request and an internal electric power generation request. The external electric power generation request is made by the driver, or the like, of the vehicle 110 on which the fuel cell system 100 is mounted. The internal electric power generation request is made for supplying electric power to the auxiliary machines of the fuel cell system 100.

Figure 2:
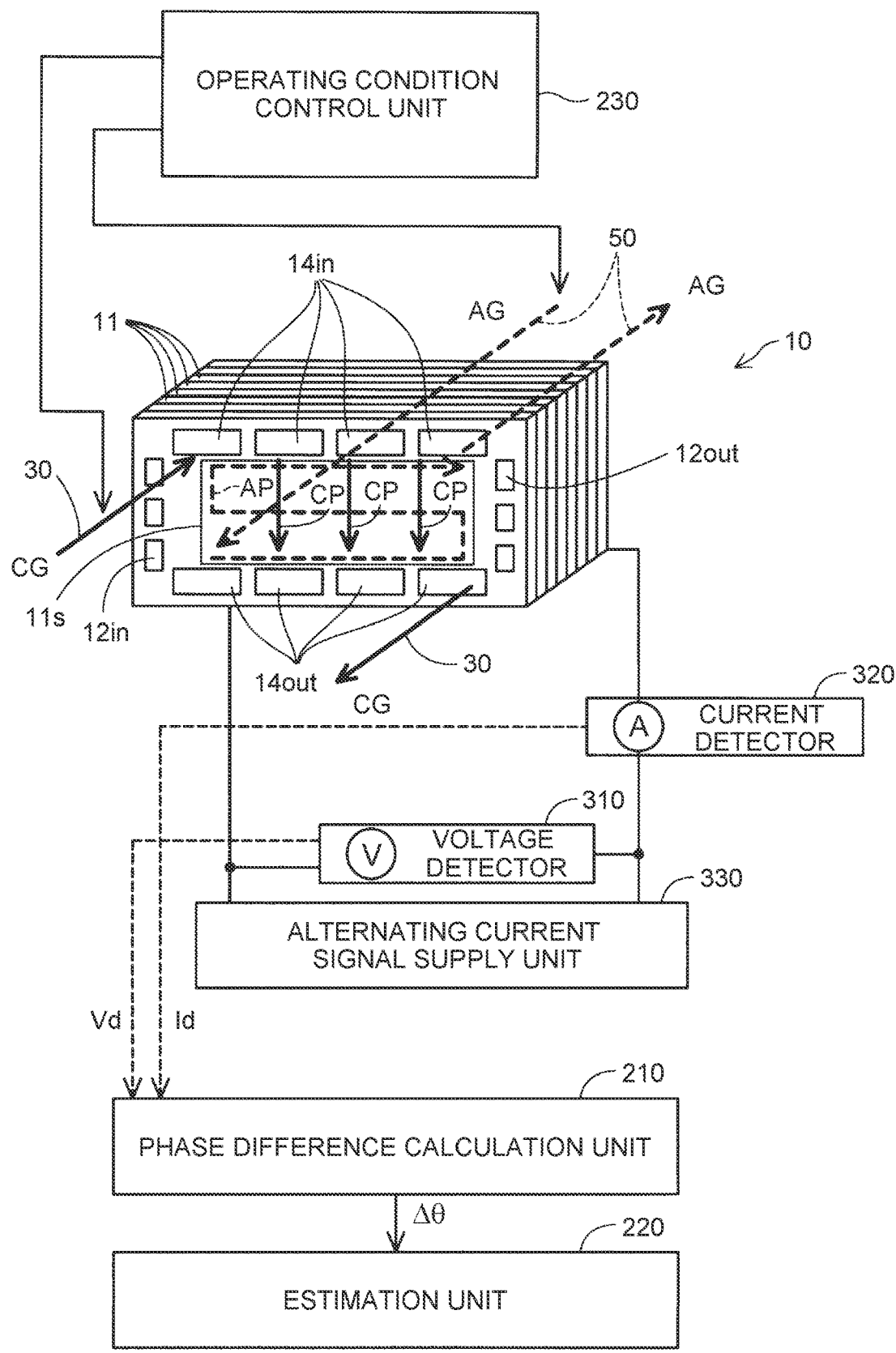
FIG. 2 is an explanatory view showing a device configuration relating to estimation of an electric power generation distribution in a cell surface.

FIG. 2 is an explanatory view showing a device configuration relating to estimation of an electric power generation distribution in the cell surface. Here, a cell surface 11s of the single cell 11 is drawn. The fuel cell stack 10 has a plurality of manifolds formed to extend through the single cells 11. The manifolds include an anode gas supply manifold 12in, an anode gas discharge manifold 12out, a cathode gas supply manifold 14in, and a cathode gas discharge manifold 14out. Anode gas AG supplied by the anode gas supply unit 50 is distributed to each of the single cells 11 through the anode gas supply manifold 12in, and is discharged through the anode gas discharge manifold 12out. The cathode gas CG supplied by the cathode gas supply unit 30 is distributed to each of the single cells 11 through the cathode gas supply manifold 14in, and is discharged through the cathode gas discharge manifold 14out. Other manifolds are provided for supplying and discharging a coolant.

Each of the single cells 11 has an in-surface anode gas passage AP and an in-surface cathode gas passage CP extending in the cell surface 11s. In this example, the in-surface anode gas passage AP has a plurality of linear portions extending linearly in a longitudinal direction and bend portions provided between the adjacent linear portions. As a whole, the in-surface anode gas passage AP has the shape of extending upward while meandering. The in-surface cathode gas passage CP has a linear shape extending downward from an upper end to a lower end of the cell surface 11s. Therefore, the flow of the anode gas AG and the flow of the cathode gas CG in the cell surface 11s are configured as orthogonal flows that are orthogonal to each other. Note that the in-surface cathode gas passage CP and the in-surface anode gas passage AP may be configured to have shapes other than the shapes disclosed. For example, they may be configured as opposed flows. In both the case of orthogonal flows as in FIG. 2 and the case of opposed flows, an inlet of the in-surface cathode gas passage CP is present in the vicinity of an outlet of the in-surface anode gas passage AP, and an outlet of the in-surface cathode gas passage CP is present in the vicinity of an inlet of the in-surface anode gas passage AP. Note that, the inlet of the in-surface cathode gas passage CP is an inlet of the cell surface 11s, and the outlet of the in-surface cathode gas passage CP is an outlet of the cell surface 11s.

The fuel cell stack 10 is connected to a voltage detector 310 that detects an output voltage of the fuel cell stack 10, and a current detector 320 that detects an output current of the fuel cell stack 10. The electrodes on both the ends of the fuel cell stack 10 are connected to an alternating current signal supply unit 330 that supplies an alternating current signal. The alternating current signal is an input signal for measuring the impedance of the fuel cell stack 10 by an alternating current impedance method. Although both an alternating current and an alternating voltage are usable as the alternating current signal, the alternating current is used in the present embodiment.

A detected alternating voltage Vd that is detected by the voltage detector 310 and a detected alternating current Id that is detected by the current detector 320 are supplied to a phase difference calculation unit 210. The phase difference calculation unit 210 has a function of calculating a phase difference Δθ between the detected alternating current Id and the detected alternating voltage Vd. The calculation can be executed by fast Fourier transform processing, for example. The phase difference Δθ is supplied from the phase difference calculation unit 210 to an estimation unit 220. The estimation unit 220 has a function of estimating, in accordance with the phase difference Δθ, an electric power generation distribution feature amount representing an electric power generation distribution in the cell surface 11s of the fuel cell stack 10. The estimating function will be described later.

In the example of FIG. 2, the voltage detector 310 measures the voltage of the entire fuel cell stack 10. Instead of the entire fuel cell stack 10, the voltage detector 310 may measure the voltage of one or more single cells 11 that constitute some of the components of the fuel cell stack 10. In the present specification, the term "fuel cell" is used in a broader sense to refer to both the entire fuel cell stack 10 and one or more single cells 11 that constitute some of the components of the fuel cell stack 10.

The system of FIG. 2 further includes an operating condition control unit 230. The operating condition control unit 230 controls an operating condition of the fuel cell system 100 in accordance with the phase difference Δθ calculated in the phase difference calculation unit 210. Specific examples of the control will be described later. The phase difference calculation unit 210, the estimation unit 220, and the operating condition control unit 230 may be configured to be included in the controller 20 shown in FIG. 1.

Figure 3:
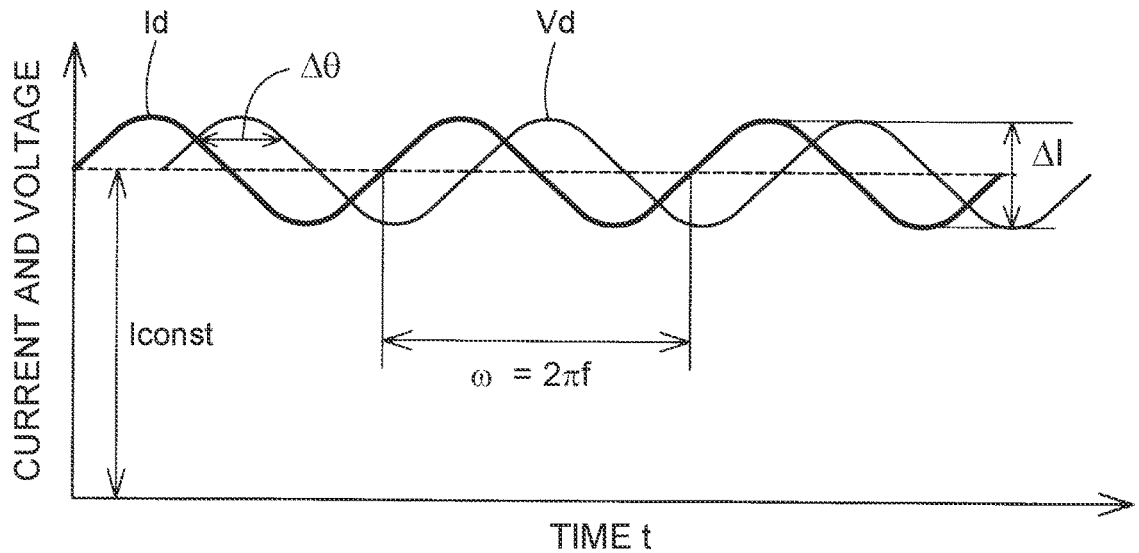
FIG. 3 is a timing chart showing a relationship between a detected alternating current and a detected alternating voltage.

FIG. 3 is a timing chart showing a relationship between the detected alternating current Id and the detected alternating voltage Vd. Here, FIG. 3 depicts the detected alternating current Id and the detected alternating voltage Vd that are detected as a result that an alternating current component ΔI is superimposed on a direct current component Iconst that is an output current of the fuel cell stack 10 by the alternating current signal supply unit 330. The alternating current component ΔI is a sine wave having a frequency f and an angular frequency ω (=2πf). As the waveform of the alternating current signal superimposed by the alternating current signal supply unit 330, waveforms other than the sine wave may also be used, such as a triangular wave, a rectangular wave, and a pulse wave.

As known well, a frequency domain used in the alternating current impedance method is divided into a low frequency domain where the real part of an impedance is equal to the sum of a proton shift resistance and a gas reaction resistance, and a high frequency domain where the real part of the impedance is equal to the proton shift resistance. In the present embodiment, it is preferable to set the frequency f of the alternating current signal to a value of the low frequency domain. Specifically, it is preferable to set the frequency f to a value of 1 Hz or more and 150 Hz or less. It is still more preferable to set the frequency f to a value of 1 Hz or more and below 100 Hz. It is most preferable to set the frequency f to a value of 20 Hz or more and 80 Hz or less. In the present embodiment, unlike the general alternating current impedance method, it is sufficient to use only one specific frequency, and calculate a phase difference Δθ between the detected alternating current Id and the detected alternating voltage Vd for the specific frequency.

The phase difference calculation unit 210 calculates the phase difference Δθ between the detected alternating current Id and the detected alternating voltage Vd. As known well, an equivalent circuit of the fuel cell is configured from a resistance component and a capacity component. Accordingly, as shown in FIG. 3, a phase relation is generally obtained in which the phase of the detected alternating current Id advances with respect to the detected alternating voltage Vd. In the present specification, the phase difference Δθ when the phase of the detected alternating current Id advances with respect to the detected alternating voltage Vd is expressed with a negative value, whereas when the phase of the detected alternating current Id is delayed with respect to the detected alternating voltage Vd, the phase difference Δθ is expressed with a positive value.

Figure 4:
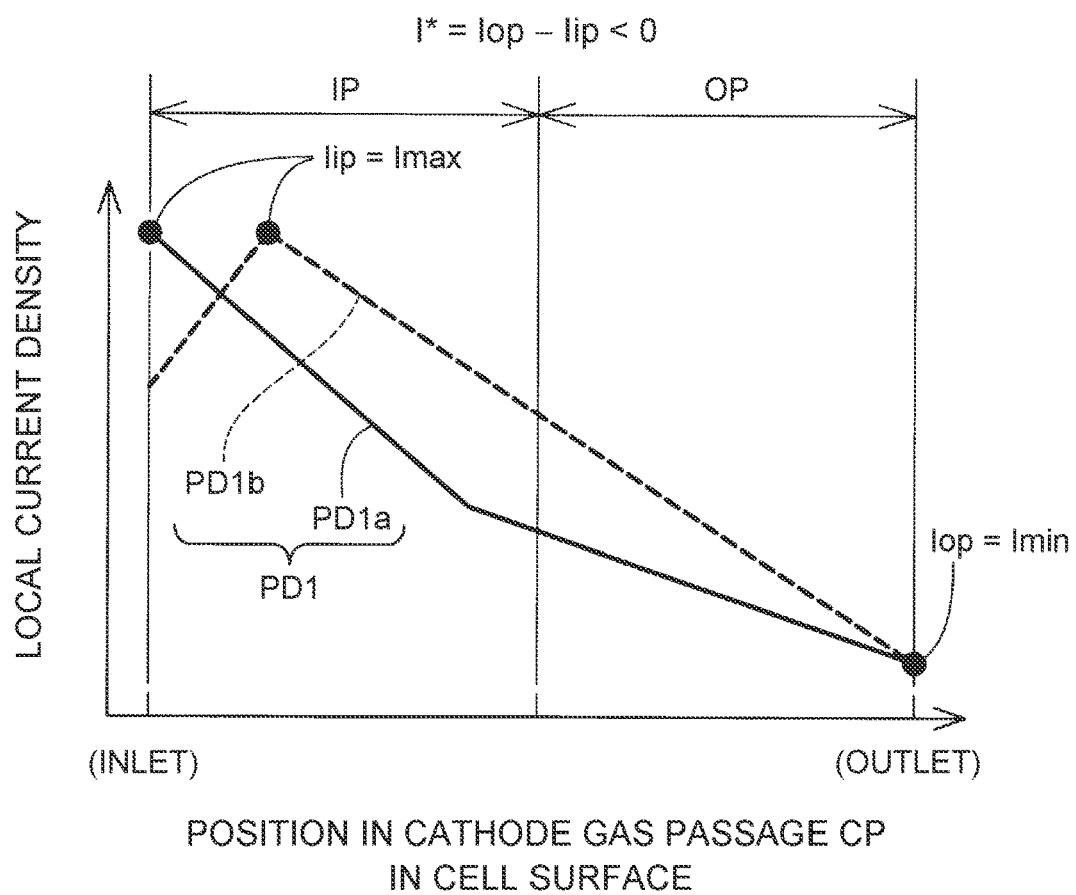
FIG. 4 is a graph view showing an example of a first electric power generation distribution in a cell surface.
Figure 5:
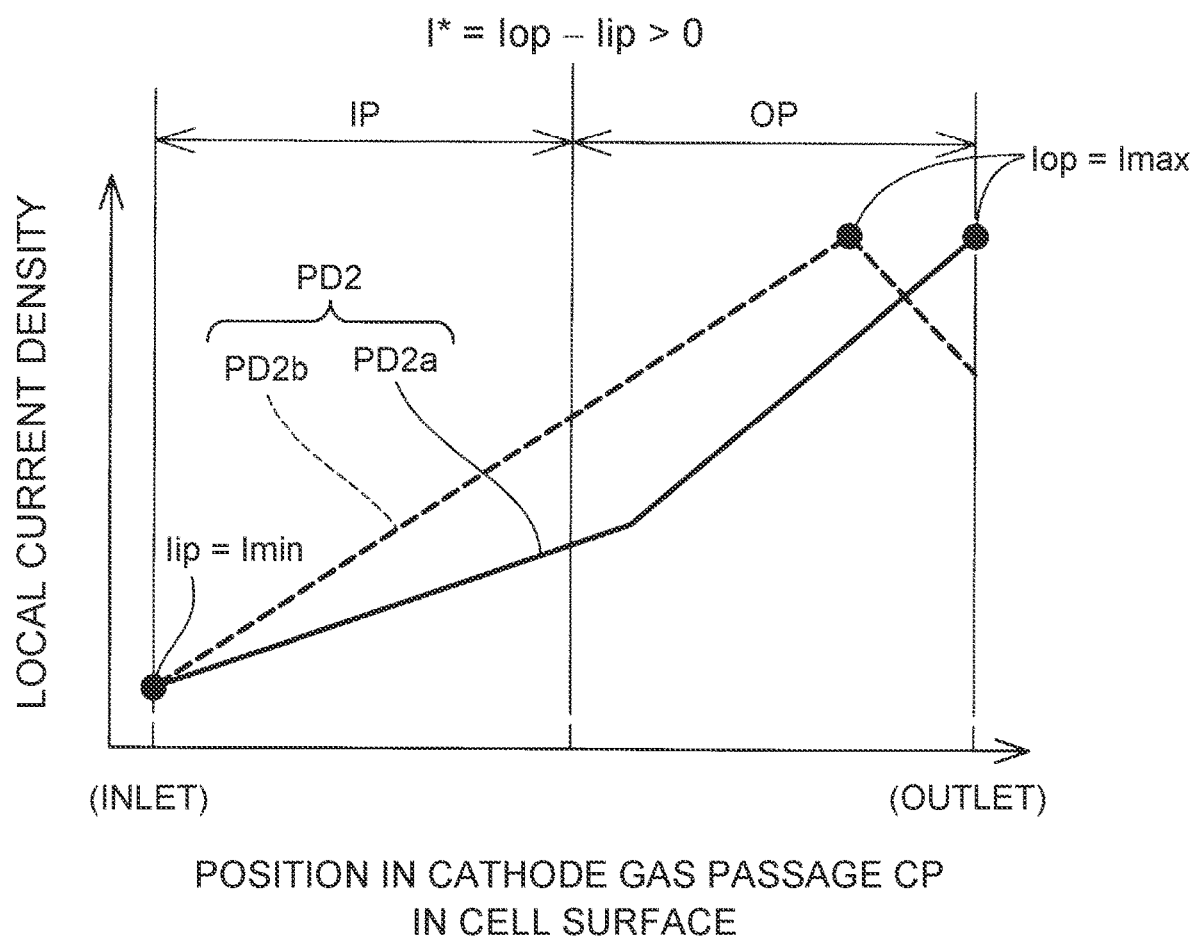
FIG. 5 is a graph view showing an example of a second electric power generation distribution in the cell surface.
Figure 6:
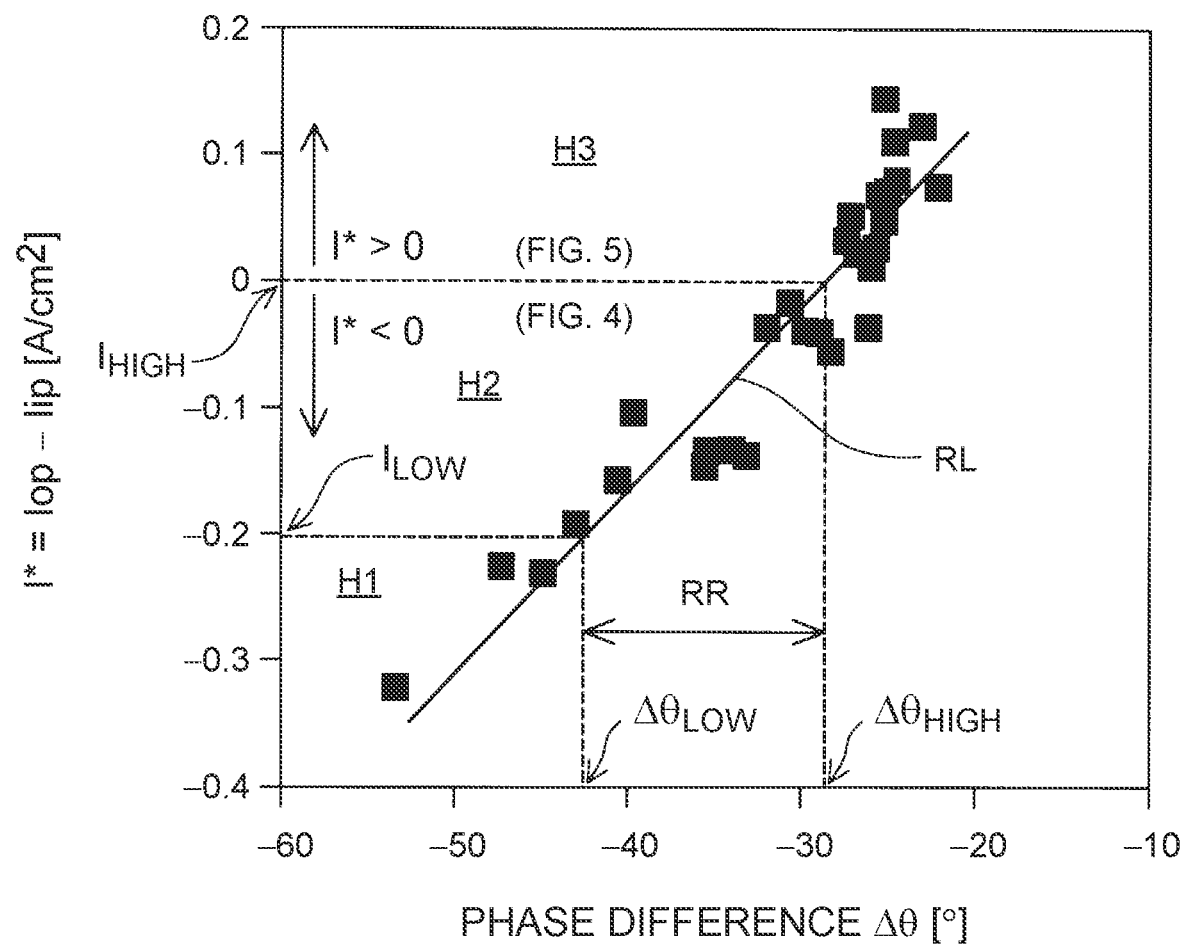
FIG. 6 is a graph view showing a relationship between a phase difference of current vs voltage and an electric power generation distribution feature amount.

The inventor of this application found out that a correlation described below with reference to FIGS. 4 to 6 is present between the phase difference Δθ and the electric power generation distribution in the cell surface 11s.

FIG. 4 is a graph view showing an example of a first electric power generation distribution PD1 in the cell surface 11s. A horizontal axis of FIG. 4 represents a position from the inlet to the outlet of the in-surface cathode gas passage CP, and a vertical axis represents a local current density. The in-surface cathode gas passage CP may be divided into an upstream portion IP on the inlet side and a downstream portion OP on the outlet side of the in-surface cathode gas passage CP.

In FIG. 4, two distributions PD1a, PD1b are illustrated as the first electric power generation distribution PD1. In one first electric power generation distribution PD1a, the local current density marks a maximum value Imax at the inlet of the in-surface cathode gas passage CP, and then reduces approximately monotonically toward the outlet, where a minimum value Imin is marked. In the other first electric power generation distribution PD1b, the local current density marks the maximum value Imax at a position slightly downstream from the inlet of the in-surface cathode gas passage CP, and then reduces approximately monotonically toward the outlet, where the minimum value Imin is marked. The first electric power generation distributions PD1a, PD1b are similar in that the maximum value Imax of the local current density is present in the upstream portion IP, and the minimum value Imin is present in the downstream portion OP. Experiments conducted by the inventor of this application indicate that there is a high possibility that the first electric power generation distribution PD1 is presented when the single cells 11 are dry. The reason thereof is as estimated below. That is, when the single cells 11 are dry, the electrolyte membrane gains a lowered proton mobility. This causes a decrease in local current density at the inlet of in-surface anode gas passage AP (which is in the vicinity of the outlet of the in-surface cathode gas passage CP as described in FIG. 2). At the time, a difference between the maximum value Imax and the minimum value Imin of the local current density tends to become larger as the dryness of the single cells 11 is higher.

In the present embodiment, used as an electric power generation distribution feature amount that represents the first electric power generation distribution PD1 is a value I* that is obtained by subtracting the maximum value Imax that is an extreme Iip of the local current density in the upstream portion IP from the minimum value Imin that is an extreme Iop of the local current density in the downstream portion OP. Therefore, the electric power generation distribution feature amount I* for the first electric power generation distribution PD1 becomes a negative value. The electric power generation distribution feature amount I* represents a difference between the maximum value Imax and the minimum value Imin of the local current density in the cell surface 11s. As described above, the difference between the maximum value Imax and the minimum value Imin of the local current density tends to become larger as the dryness of the single cells 11 is higher. Hence, an absolute value of the electric power generation distribution feature amount I* also becomes larger as the dryness of the single cells 11 is higher.

FIG. 5 is a graph view showing an example of second electric power generation distributions PD2a, PD2b in the cell surface 11s. In one second electric power generation distribution PD2a, the local current density marks a minimum value Imin at the inlet of the in-surface cathode gas passage CP, and then increases approximately monotonically toward the outlet, where a maximum value Imax is marked. In the other second electric power generation distribution PD2b, the local current density marks a minimum value Imin at the inlet of the in-surface cathode gas passage CP, then increases approximately monotonically toward the outlet, and marks a maximum value Imax at a position slightly upstream from the outlet. The second electric power generation distributions PD2a, PD2b are similar in that the maximum value Imax of the local current density is present in the downstream portion OP, and the minimum value Imin is present in the upstream portion IP. The experiments conducted by the inventor of this application indicate that there is a high possibility that the second electric power generation distribution PD2 is established when the single cells 11 are too wet. The reason thereof is as estimated below. That is, when the single cells 11 are too wet, it is highly likely that water clogging occurs in the vicinity of the inlet of the in-surface cathode gas passage CP. As a result, sufficient supply of cathode gas in the vicinity of the inlet of the in-surface cathode gas passage CP is hindered, resulting in decrease in local current density.

Used as an electric power generation distribution feature amount that represents the second electric power generation distribution PD2 is a value I* that is obtained by subtracting the minimum value Imin that is an extreme Iip of the local current density in the upstream portion IP from the maximum value Imax that is an extreme Top of the local current density in the downstream portion OP. Therefore, the electric power generation distribution feature amount I* for the second electric power generation distribution PD2 becomes a positive value. The electric power generation distribution feature amount I* also represents a difference between the maximum value Imax and the minimum value Imin of the local current density in the cell surface 11s.

As described above, in the first electric power generation distribution PD1 shown in FIG. 4, the electric power generation distribution feature amount I* becomes a negative value, whereas in the second electric power generation distribution PD2 shown in FIG. 5, the electric power generation distribution feature amount I* becomes a positive value. Conversely, when the electric power generation distribution feature amount I* is negative, it can be estimated that the electric power generation distribution in the cell surface 11s is the first electric power generation distribution PD1. When the electric power generation distribution feature amount I* is positive, it can be estimated that the electric power generation distribution in the cell surface 11s is the second electric power generation distribution PD2.

FIG. 6 is a graph view showing a relationship RL between the phase difference Δθ of the detected alternating current Id vs the detected alternating voltage Vd and the electric power generation distribution feature amount I*. Plotting points of FIG. 6 represent the results of the experiments performed by the inventor of this application with use of the current density sensor. It can be understood that a practically linear relationship RL is present between the phase difference Δθ and the electric power generation distribution feature amount I*. When the electric power generation distribution feature amount I* is negative, it can be estimated that the electric power generation distribution in the cell surface 11s is the first electric power generation distribution PD1 described in FIG. 4. When the electric power generation distribution feature amount I* is positive, it can be estimated that the electric power generation distribution in the cell surface 11s is the second electric power generation distribution PD2 described in FIG. 5. As described in FIG. 4, the absolute value of the electric power generation distribution feature amount I* for the first electric power generation distribution PD1a becomes larger as the dryness of the single cell 11 is higher.

The wet state of the fuel cell includes a first state H1 where the fuel cell is too dry, a second state H2 where the fuel cell is appropriately wet, and a third state H3 where the fuel cell is too wet. The second state H2 is the state in a predetermined wetness range. The first state H1 is the state where the wetness is lower than the wetness range of the second state H2. The third state H3 is the state where the wetness is higher than the wetness range of the second state H2. In the example shown in FIG. 6, the range where the electric power generation distribution feature amount I* is smaller than a lower limit $I_{LOW}$ corresponds to the first state H1 where the fuel cell is too dry. The range where the electric power generation distribution feature amount I* is the lower limit $I_{LOW}$ to an upper limit $I_{HIGH}$ corresponds to the second state H2 where the fuel cell is appropriately wet. The range where the electric power generation distribution feature amount I* exceeds the upper limit $I_{HIGH}$ corresponds to the third state H3 where the fuel cell is too wet. In this case, the appropriate range of the electric power generation distribution feature amount I* is the range from the lower limit $I_{LOW}$ to the upper limit $I_{HIGH}$.

Since the predetermined relationship RL is present between the phase difference $\Delta\theta$ and the electric power generation distribution feature amount I*, whether the wet states of the fuel cell is H1, H2, or H3 can be estimated based on the value of the phase difference $\Delta\theta$. In short, when the phase difference $\Delta\theta$ is in an appropriate range RR, it can be estimated that the fuel cell is in the second state H2 where the fuel cell is appropriately wet. When the phase difference $\Delta\theta$ is smaller than a lower limit $\Delta\theta_{LOW}$ of the appropriate range RR, it can be estimated that the fuel cell is in the first state H1 where the fuel cell is too dry. When the phase difference $\Delta\theta$ is larger than an upper limit $\Delta\theta_{HIGH}$ of the appropriate range RR, it can be estimated that the fuel cell is in the third state H3 where the fuel cell is too wet. Since the appropriate range of the phase difference $\Delta\theta$ and the electric power generation distribution feature amount I* is dependent on the structure of the single cell 11, or the like, the appropriate range is experimentally or experientially set in advance for each model of the fuel cell stack 10. The appropriate range of the phase difference $\Delta\theta$ and the electric power generation distribution feature amount I* is also called "allowable range."

Figure 7:
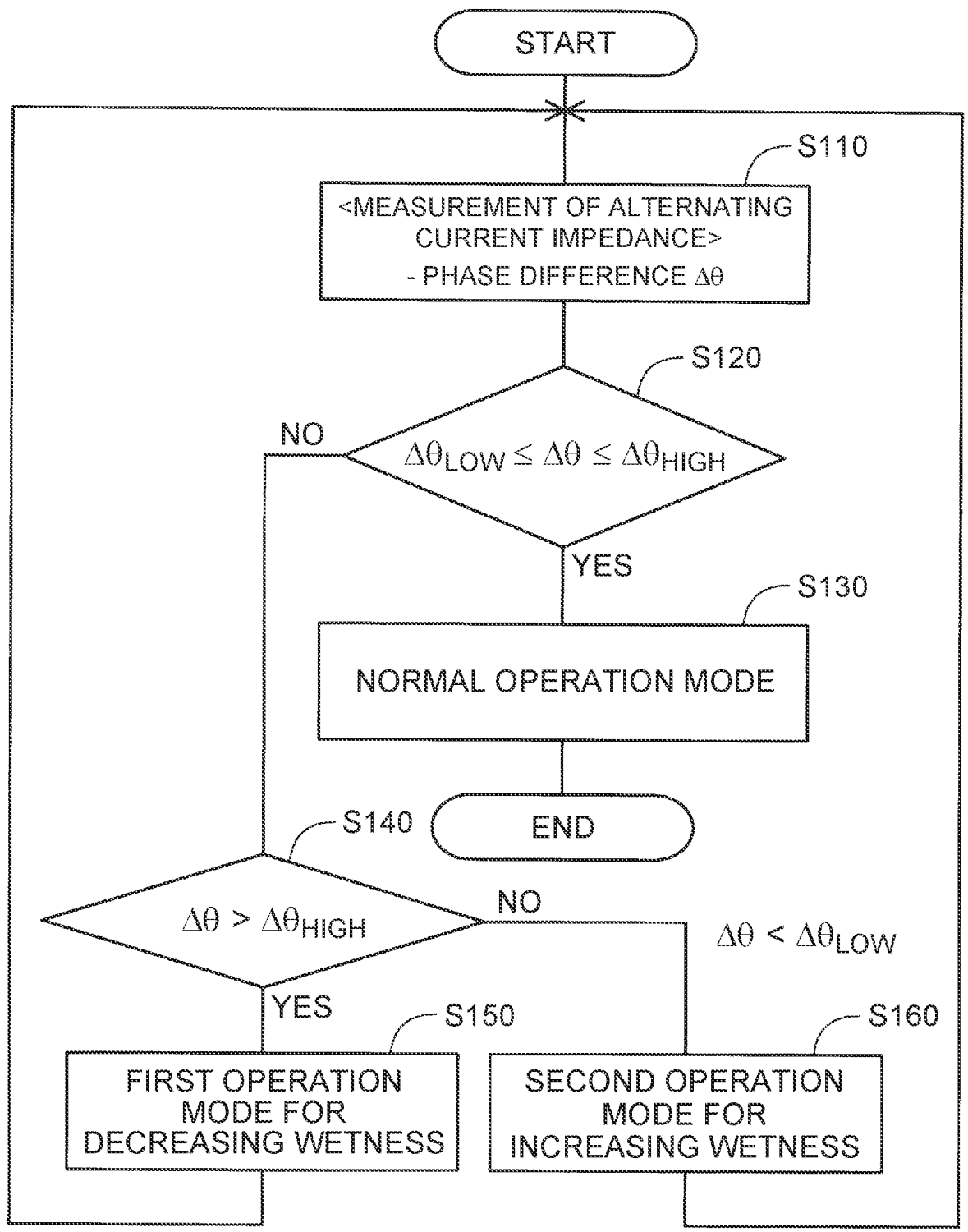
FIG. 7 is a flowchart showing a procedure for measurement of the phase difference and switching of operation modes.

FIG. 7 is a flowchart showing a procedure for measurement of the phase difference $\Delta\theta$ and switching of operation modes. The procedure is repeatedly executed on a regular basis by the controller 20, after the fuel cell system 100 starts up and normal operation is started. When the process of FIG. 7 is started, the fuel cell system 100 is operated in a normal operation mode. The normal operation mode is other than a first operation mode executed in step S160 for decreasing the wetness of the fuel cell and a second operation mode executed in step S170 for increasing the wetness of the fuel cell.

In step S110, measurement of an alternating current impedance is executed, and a phase difference $\Delta\theta$ between the detected alternating current Id and the detected alternating voltage Vd is calculated. Specifically, the alternating current signal supply unit 330 shown in FIG. 2 applies an alternating current signal to the electrodes on both the ends of the fuel cell. Based on the detected alternating voltage Vd that is detected by the voltage detector 310 and the detected alternating current Id that is detected by the current detector 320 in response to the applied alternating current signal, the phase difference calculation unit 210 calculates a phase difference $\Delta\theta$. The phase difference $\Delta\theta$ is supplied to the estimation unit 220.

In step S120, the estimation unit 220 determines whether the phase difference $\Delta\theta$ is in the appropriate range RR shown in FIG. 6. The range RR is a range from the lower limit $\Delta\theta_{LOW}$ to the upper limit $\Delta\theta_{HIGH}$. When the phase difference $\Delta\theta$ is in the appropriate range RR, it can be estimated that the fuel cell is in the second state H2 where the fuel cell is appropriately wet. Accordingly, in step S130, the normal operation mode is maintained, and the process of FIG. 7 is ended. When the phase difference $\Delta\theta$ is not in the appropriate range RR, whether the phase difference $\Delta\theta$ is larger than the upper limit $\Delta\theta_{HIGH}$ of the appropriate range RR is determined in step S140.

When the phase difference $\Delta\theta$ is larger than the upper limit $\Delta\theta_{HIGH}$ of the appropriate range RR, it can be estimated that the fuel cell is in the third state H3 where the fuel cell is too wet. Accordingly, the procedure proceeds from step S140 to step S150. In step S150, the operating condition control unit 230 operates the fuel cell system 100 in the first operation mode for decreasing the wetness of the fuel cell. In the first operation mode, one or more of the following operations can be used. (C-1a) Increase the amount of water discharged from the inside of the fuel cell to the outside by increasing the speed of the compressor 33 and thereby increasing the supply flow rate of cathode gas to the fuel cell. (C-1b) Increase the amount of water discharged from the inside of the fuel cell to the outside by changing a set value of the first regulator 42 and thereby decreasing the cathode gas pressure in the fuel cell. (C-1c) When the cathode gas supply unit 30 is equipped with a humidifier, decrease the amount of humidification by the humidifier. In the first operation mode using these operations, one or more parameters, out of the speed of the compressor 33, the set value of the first regulator 42, and the amount of humidification by the humidifier, correspond to the control amount controlled by the operating condition control unit 230, that is, the operating condition of the fuel cell system 100.

For the anode gas, one or more of the following operations may similarly be used to decrease the wetness of the fuel cell. (A-1a) Increase the amount of water discharged from the inside of the fuel cell to the outside by increasing the speed of the anode gas pump 65 and thereby increasing the supply flow rate of anode gas to the fuel cell. (A-1b) Increase the amount of water discharged from the inside of the fuel cell to the outside by temporarily decreasing the amount of anode gas supplied by the injectors 55 and thereby decreasing the anode gas pressure in the fuel cell. (A-1c) When the anode gas supply unit 50 is equipped with a humidifier, decrease the amount of humidification by the humidifier.

When the phase difference $\Delta\theta$ is larger than the upper limit $\Delta\theta_{HIGH}$ of the appropriate range RR in step S140, the phase difference $\Delta\theta$ is smaller than the lower limit $\Delta\theta_{LOW}$ of the appropriate range RR. In this case, it can be estimated that the fuel cell is in the first state H1 where the fuel cell is too dry. Accordingly, the procedure proceeds from step S140 to step S160. In step S160, the operating condition control unit 230 operates the fuel cell system 100 in the second operation mode for increasing the wetness of the fuel cell. In the second operation mode, one or more of the following operations can be used. (C-2a) Decrease the amount of water discharged from the inside of the fuel cell to the outside by decreasing the speed of the compressor 33 and thereby decreasing the supply flow rate of cathode gas to the fuel cell. (C-2b) Decrease the amount of water discharged from the inside of the fuel cell to the outside by changing the set value of the first regulator 42 and thereby increasing the cathode gas pressure in the fuel cell. (C-2c) When the cathode gas supply unit 30 is equipped with a humidifier, increase the amount of humidification by the humidifier.

For the anode gas, one or more of the following operations may similarly be used to increase the wetness of the fuel cell. (A-2a) Decrease the amount of water discharged from the inside of the fuel cell to the outside by decreasing the speed of the anode gas pump 65 and thereby decreasing the supply flow rate of anode gas to the fuel cell. (A-2b) Decrease the amount of water discharged from the inside of the fuel cell to the outside by temporarily increasing the amount of anode gas supplied by the injectors 55 and thereby increasing the anode gas pressure in the fuel cell. (A-2c) When the anode gas supply unit 50 is equipped with a humidifier, increase the amount of humidification by the humidifier.

After step S150 or step S160, the process subsequent to step S110 is executed again. When the phase difference Δθ returns to the appropriate range RR after the procedure returns from step S150 or step S160 to step S110, the procedure proceeds to step S130, where the operating condition control unit 230 switches the operation mode to the normal operation mode, and ends the process of FIG. 7.

The process of FIG. 7 described above is the process for changing the operating condition of the fuel cell system 100 such that the state of the fuel cell is adjusted to be the second state H2 that is an appropriate wet state, when the state of the fuel cell is estimated to be the first state H1 or the third state H3 that are not the appropriate wet state. When such a process is executed, the fuel cell system 100 can appropriately be controlled to be in the second state H2 where the fuel cell is appropriately wet in accordance with the phase angle Δθ.

The process of FIG. 7 can also be considered as a process of changing the operating condition of the fuel cell system 100 such that the electric power generation distribution feature amount I* falls within a predetermined allowable range, when the electric power generation distribution feature amount I* estimated based on the phase difference Δθ is out of the allowable range. When such a process is executed in the case where the electric power generation distribution feature amount I*, representing a difference between the maximum value Imax and the minimum value Imin of the local current density in the cell surface 11s, is out of the allowable range, the fuel cell system 100 can be controlled under an appropriate operating condition such that the electric power generation distribution feature amount I* falls within the allowable range.

In FIGS. 6 and 7, the wet state of the fuel cell is divided into three states H1 to H3 in accordance with the phase difference Δθ. However, the wet state of the fuel cell may be divided into two states, or may be divided into four or more states. In any of these cases, the operating condition control unit 230 can change the operating condition of the fuel cell system 100 in accordance with the phase difference Δθ and execute control of the wet state of the fuel cell. In this case, the operating condition control unit 230 preferably performs control under the operating condition where when the phase difference Δθ is large, the wetness of the fuel cell is lower than when the phase difference Δθ is small. The control can also be considered as the control under the operating condition where when the phase difference Δθ is a second value that is larger than a first value, the wetness of the fuel cell is lower than when the phase difference Δθ is the first value. The control corresponds to the control of step S150 in FIG. 7, for example. With the control, the wet state of the fuel cell can appropriately be controlled in accordance with the phase difference Δθ.

The operating condition control unit 230 also preferably performs control under the operating condition where when the phase difference Δθ is small, the wetness of the fuel cell is higher than when the phase difference Δθ is large. The control can also be considered as the control under the operating condition where when the phase difference Δθ is a third value that is smaller than the first value, the wetness of the fuel cell is higher than when the phase difference Δθ is the first value. The control corresponds to the control of step S160 in FIG. 7, for example. With the control, the wet state of the fuel cell can also appropriately be controlled in accordance with the phase difference Δθ.

As described in the foregoing, the present embodiment utilizes the prescribed relationship RL present between the electric power generation distribution feature amount I*, representing a difference between the maximum value Imax and the minimum value Imin of the local current density in the cell surface 11s, and the phase difference Δθ. Based on the relationship RL, the fuel cell system 100 in the present embodiment estimates the electric power generation distribution feature amount I* in accordance with the phase difference Δθ. Hence, the fuel cell system 100 can estimate the electric power generation distribution in the cell surface 11s of the fuel cell without providing a current density sensor.

In the embodiment disclosed, used as the electric power generation distribution feature amount I* is a value obtained by subtracting an extreme Iip of the local current density in the upstream portion IP from an extreme Top of the local current density in the downstream portion OP. However, it is also possible to use other electric power generation distribution feature amounts I*. The electric power generation distribution feature amounts I* preferably includes a value representing a difference between the maximum value Imax and the minimum value Imin of the local current density in the cell surface 11s. In that case, a value that does not indicate whether the electric power generation distribution in the cell surface 11s is the electric power generation distribution PD1 or the electric power generation distribution PD2 may be used as the electric power generation distribution feature amount I*.

In the embodiment, the electric power generation distribution feature amount I* indicates whether the electric power generation distribution corresponds to the electric power generation distribution PD1 or the electric power generation distribution PD2 is distinguished with the positive and negative signs of the electric power generation distribution feature amount I*. However, the electric power generation distributions PD1, PD2 may be distinguished by other methods. For example, instead of the positive and negative signs, an independent one bit that is different from a bit representing the difference between the maximum value Imax and the minimum value Imin may be used to distinguish the first electric power generation distribution PD1 and the second electric power generation distribution PD2. It is note that distinguishing the electric power generation distributions with use of the positive and negative signs of the electric power generation distribution feature amount I* offers an advantage that the electric power generation distribution can easily be estimated based on the electric power generation distribution feature amount I*.

Without being limited to the aforementioned embodiment, examples, or modifications, the present disclosure can be implemented in various configurations without departing from the meaning thereof. For example, technical features in the embodiments, examples, and modifications corresponding to the technical features in each aspect disclosed in SUMMARY can properly be replaced or combined in order to solve some or all of the aforementioned problems, or in order to accomplish some or all of the aforementioned effects. The technical features may properly be deleted unless otherwise specified as essential elements in this specification.

What is claimed is:

1. A fuel cell system, comprising:
a fuel cell;
a voltage detector configured to detect an output voltage of the fuel cell;
a current detector configured to detect an output current of the fuel cell;
an alternating current signal supply unit configured to supply an alternating current signal to electrodes on both ends of the fuel cell;
a phase difference calculation unit configured to calculate, based on a detected alternating voltage that is detected by the voltage detector and a detected alternating current that is detected by the current detector, a phase difference between the detected alternating current and the detected alternating voltage; and
a controller programmed to estimate, in accordance with the phase difference, an electric power generation distribution feature amount representing an electric power generation distribution in a cell surface of the fuel cell, with use of a predetermined relationship between the electric power generation distribution feature amount and the phase difference, wherein
the electric power generation distribution feature amount includes a value indicating a difference between a maximum value and a minimum value of local current density in the cell surface.

2. The fuel cell system according to claim 1, wherein:
the cell surface has an in-surface cathode gas passage from an inlet to an outlet of the cell surface for a cathode gas flowing in the cell surface; and
when the in-surface cathode gas passage is divided into an upstream portion on a side of the inlet and a downstream portion on a side of the outlet, the electric power generation distribution feature amount indicates whether the electric power generation distribution in the cell surface corresponds to a first electric power generation distribution where the maximum value of the local current density is present in the upstream portion, and the minimum value of the local current density is present in the downstream portion, or a second electric power generation distribution where the maximum value of the local current density is present in the downstream portion, and the minimum value of the local current density is present in the upstream portion.

3. The fuel cell system according to claim 2, wherein
the electric power generation distribution feature amount indicates whether the electric power generation distribution in the cell surface corresponds to the first electric power generation distribution or the second electric power generation distribution with positive and negative signs of the electric power generation distribution feature amount.

4. The fuel cell system according to claim 1, further comprising an operating condition control unit configured to change, when the electric power generation distribution feature amount estimated based on the phase difference is out of a predetermined allowable range, an operating condition of the fuel cell system such that the electric power generation distribution feature amount falls within the allowable range.

5. The fuel cell system according to claim 1, wherein the estimation unit estimates, in accordance with the phase difference, whether a wet state of the fuel cell is a first state where wetness of the fuel cell is lower than a predetermined wetness range, a second state where the wetness of the fuel cell is within the wetness range, or a third state where the wetness of the fuel cell is higher than the wetness range.

6. The fuel cell system according to claim 5, further comprising an operating condition control unit configured to change, when the fuel cell is estimated to be in the first state or the third state, an operating condition of the fuel cell system such that the fuel cell is put in the second state.

7. A fuel cell system, comprising:
a fuel cell;
a voltage detector configured to detect an output voltage of the fuel cell;
a current detector configured to detect an output current of the fuel cell;
an alternating current signal supply unit configured to supply an alternating current signal to electrodes on both ends of the fuel cell;
a phase difference calculation unit configured to calculate, based on a detected alternating voltage that is detected by the voltage detector and a detected alternating current that is detected by the current detector, a phase difference between the detected alternating current and the detected alternating voltage; and
an operating condition control unit programmed to control a wet state of the fuel cell by changing an operating condition of the fuel cell system in accordance with the phase difference, wherein
when the phase difference is a second value that is larger than a first value, the operating condition control unit sets the operating condition of the fuel cell system to an operating condition where a wetness of the fuel cell is lower than a wetness of the fuel cell when the phase difference is the first value.

* * * * *